United States Patent [19] Sabine

[11] 3,961,717

[45] June 8, 1976

[54] COMBINATION SPILL PLATE AND STEP FOR WASTE DISPOSAL VEHICLES

[76] Inventor: George L. Sabine, 524 Cleveland Town Road, Boonesboro, Md. 21713

[22] Filed: Apr. 2, 1975

[21] Appl. No.: 564,384

[52] U.S. Cl. ................................ 214/302; 214/75 R
[51] Int. Cl.[2] ........................................ B60P 1/44
[58] Field of Search ................ 214/75 R, 75 T, 302, 214/313, 315, 316, 317, 77 R, 77 P, 85, 620, 621; 193/5; 298/7

[56] References Cited

UNITED STATES PATENTS

| | | | |
|---|---|---|---|
| 2,527,818 | 10/1950 | Ives | 214/77 P |
| 3,095,073 | 6/1963 | Larson et al. | 193/5 |
| 3,795,329 | 5/1974 | Martin et al. | 214/75 T |
| 3,905,493 | 9/1975 | Logue | 214/75 T |

*Primary Examiner*—Robert J. Spar
*Assistant Examiner*—Lawrence J. Oresky
*Attorney, Agent, or Firm*—David H. Semmes

[57] ABSTRACT

A lift platform adaptable to elevate operating personnel and/or heavy objects for dumping is disclosed. The lift platform converts into a spill plate forming a liquid impervious seal with the waste vehicle thus increasing the hopper size. The step can be hydraulically operated and function as a power tailgate for horizontal lifting while folding into a spill plate at any point offering great flexibility in performance.

9 Claims, 5 Drawing Figures

COMBINATION SPILL PLATE AND STEP FOR WASTE DISPOSAL VEHICLES

BACKGROUND OF THE INVENTION

Cargo platforms that are operable as elevators, and that are storable somewhere about the truck's body so as to be movable with the truck, are well known in the prior art. Such cargo platforms may function solely as elevators, or they may also function as complete or partial closures in the form of doors or tailgates for the cargo area of the truck body. Although such cargo platforms which incorporate an elevator function have been used with the rear of trailer truck bodies for many years, an elevator step which can also function as a spill plate for a waste disposal truck has not heretofore been appreciated.

Waste disposal trucks, by design, traditionally have relatively high entrance ports at the rear of the container attachments in order to increase waste storage volume in the hopper. Entrance ports which are too low would allow for spillage of stored waste materials and thus greatly decrease the hopper volume.

Although increased hopper volume is a desirable characteristic, increasing volume by means of a relatively high entrance port at the rear of the truck container attachment is not without drawbacks. For example, trash disposal operators are required to lift extremely heavy objects including metal containers full of disposable materials over the lip at the rear of the container attachment thus emptying the waste materials into the hopper. When a container attachment is designed with a high entrance port, waste disposal which can result in discomfort and injury.

An object of the present invention is to increase hopper capacity while minimizing the above-mentioned drawbacks usually accompanying such design.

A further object of the present invention is to eliminate or greatly reduce refuse spillage from the hopper area.

A still further object of the present invention is to permit the dumping of refuse containers hydraulically in combination with a continuously variable rear step for use by operating personnel.

An additional object of the present invention is to provide a rear step which allows for heavy or bulky items to be raised automatically into position for easier placement into a truck hopper.

Yet another object of the present invention is to combine, in a single mechanism, an hydraulically operated lift platform and spill plate for increasing hopper size without decreasing access to the hopper opening.

These and other objects of this invention will appear hereinafter and for purposes of illustration, but not of limitation, specific embodiments of the invention are shown in the accompanying drawings in which.

Figure 1:
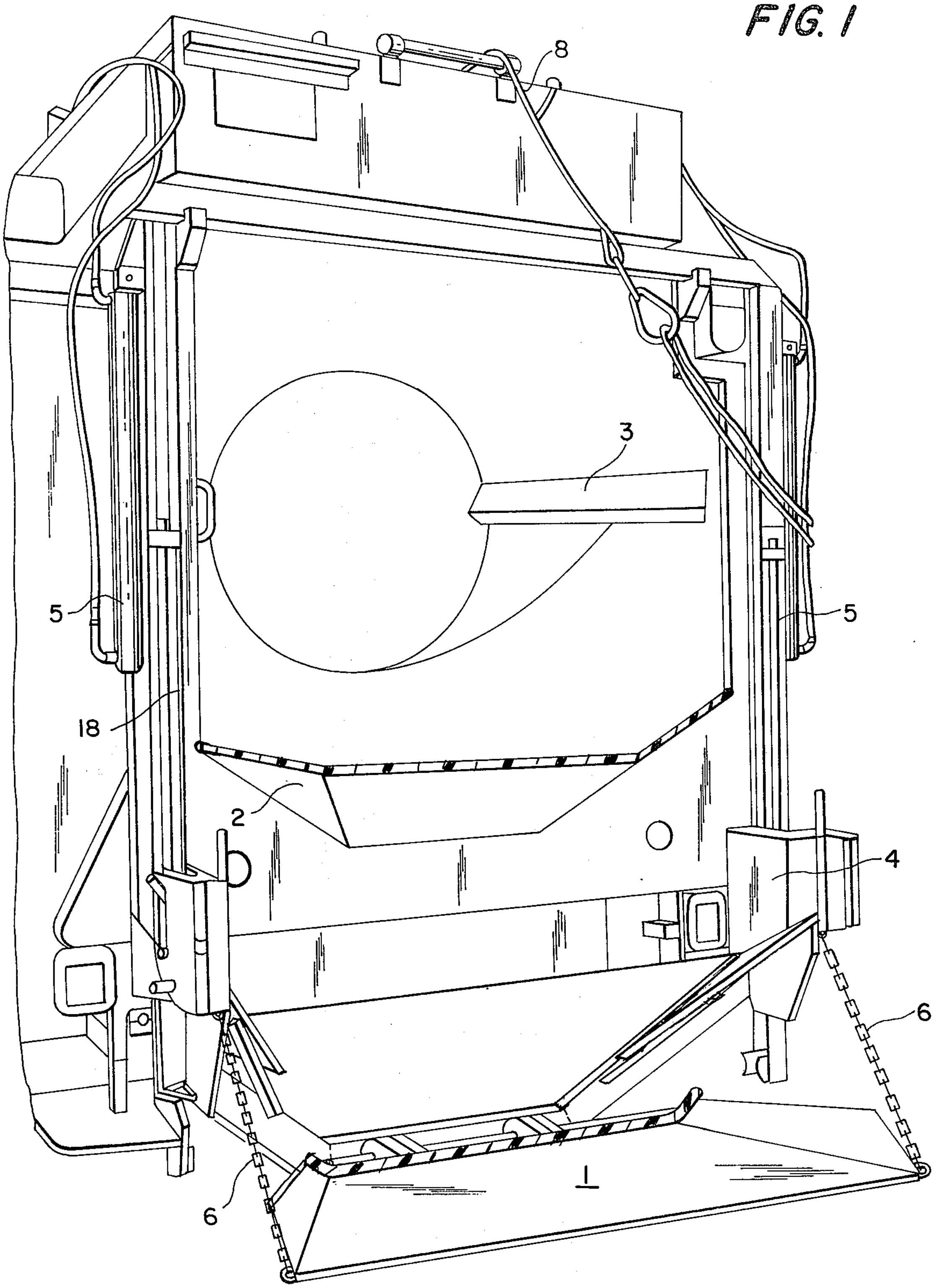
FIG. 1 is a rear perspective view showing the spill plate step (SPS) combination with the hopper of a waste disposal truck, said SPS being in a lowered position.
Figure 2:
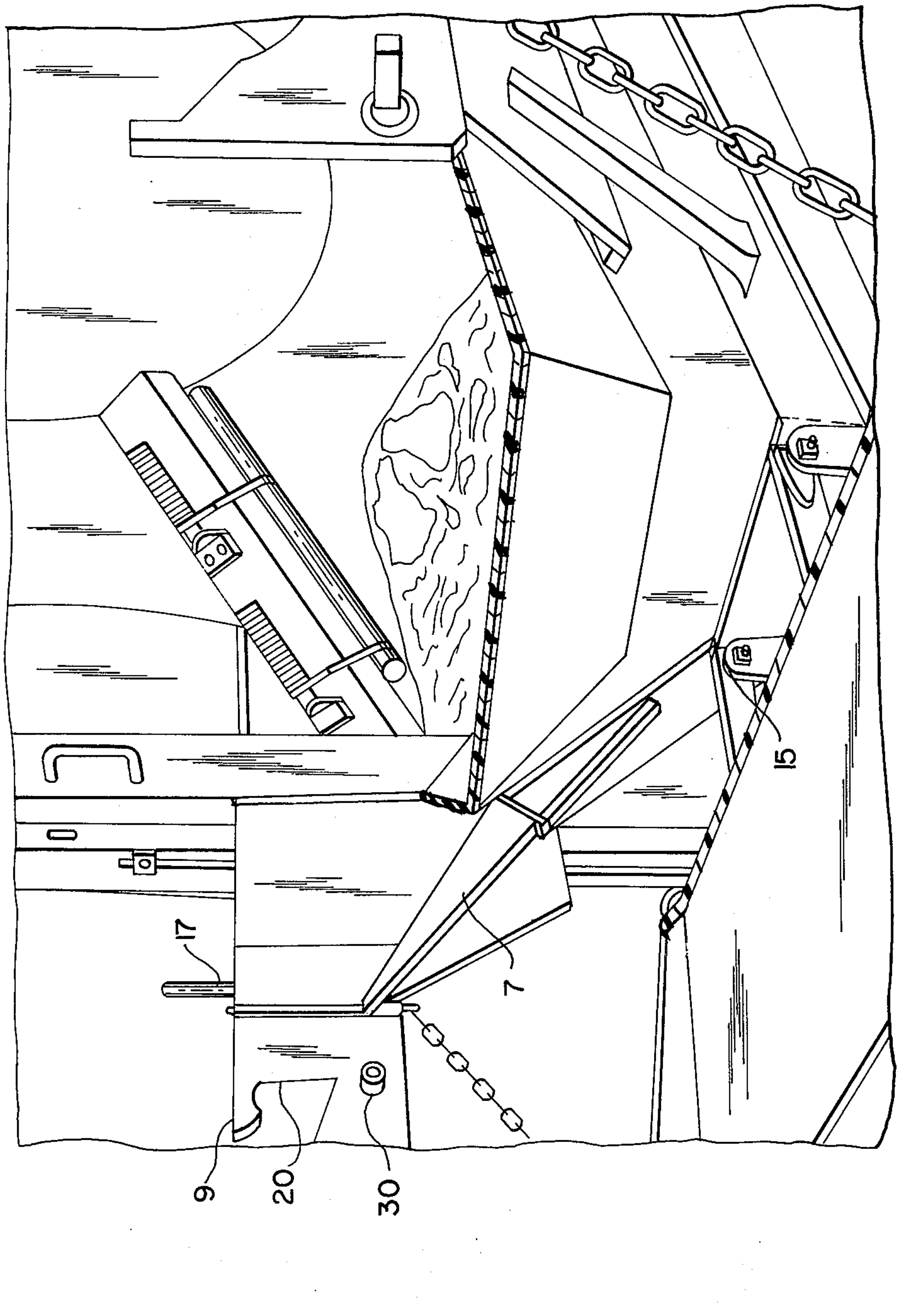
FIG. 2 is a side perspective view similar to FIG. 1 showing the SPS vertically raised in relation to the hopper port.
Figure 3:
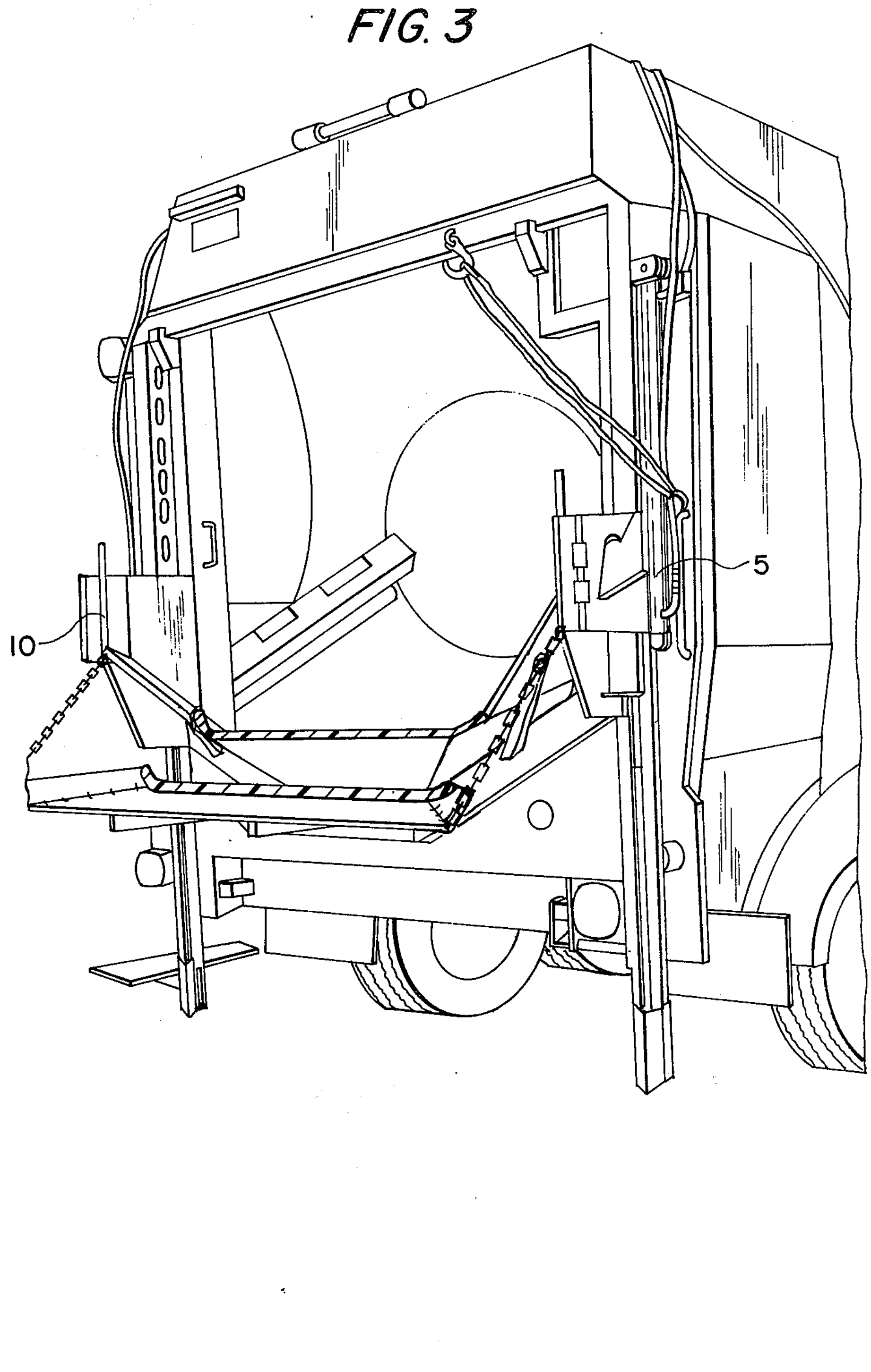
Figure 4:
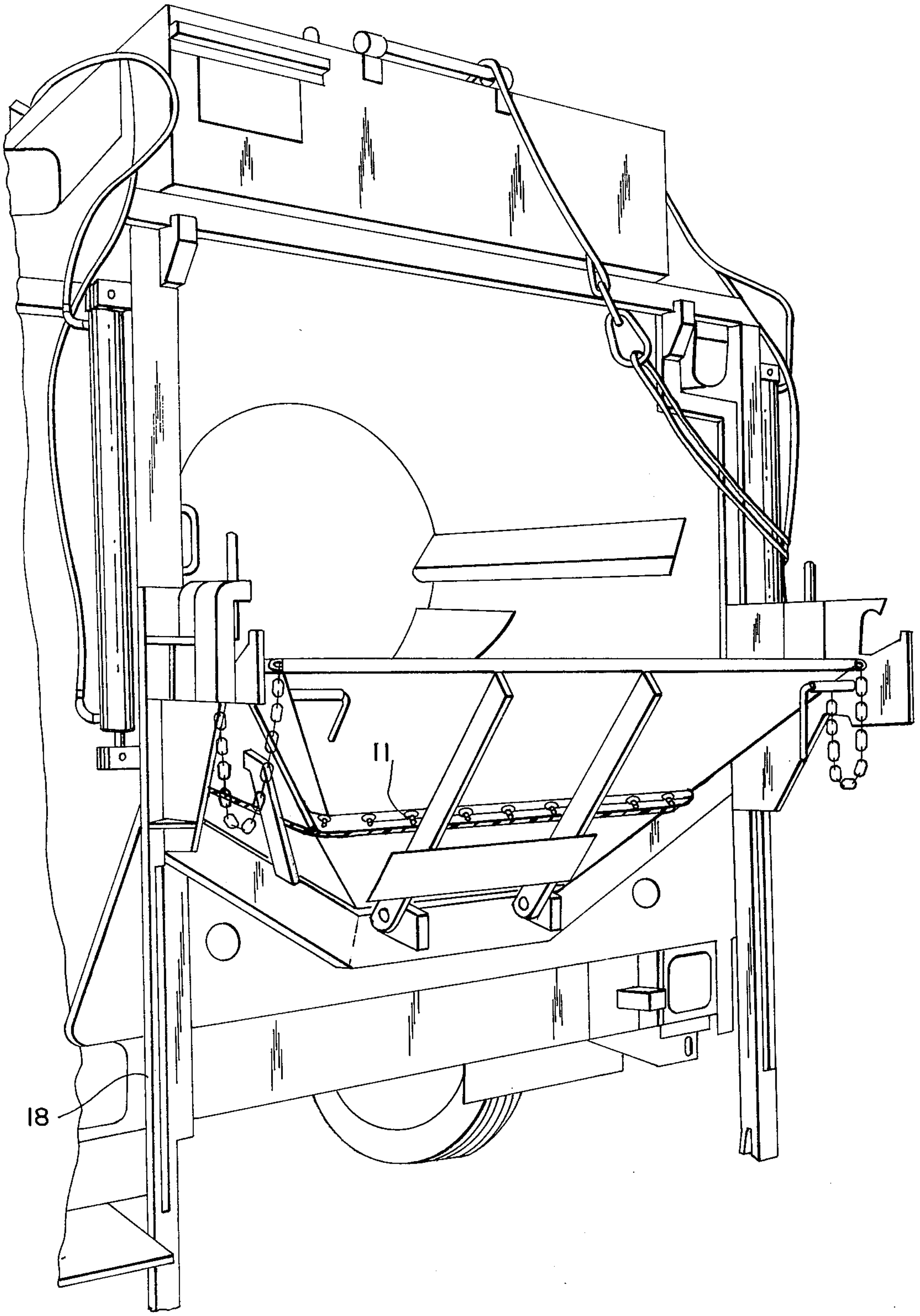
Figure 5:
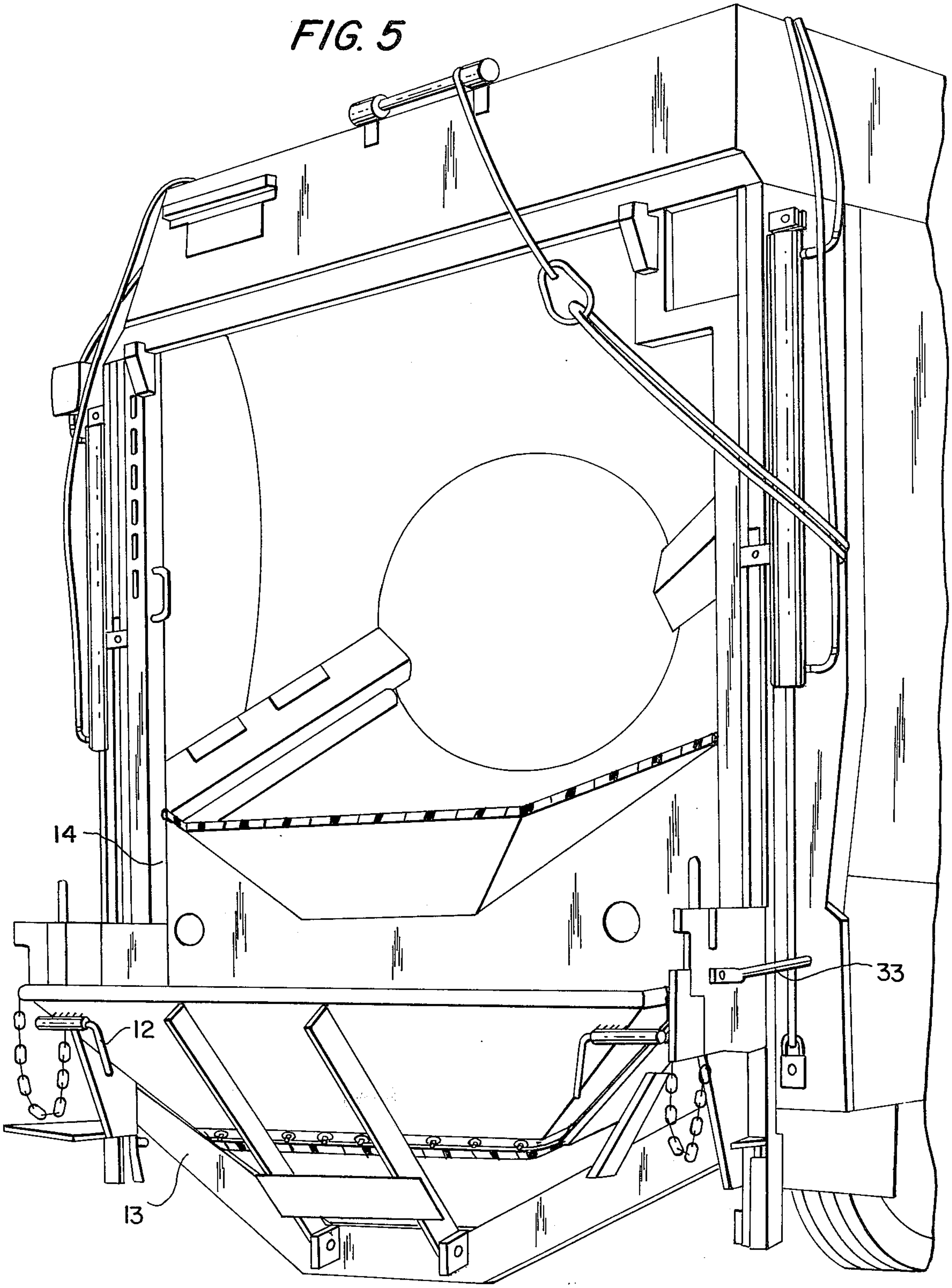

FIG. 3 further being a rear perspective view of the SPS having been raised to a maximum height as a hydraulic lift prior to conversion into a spill plate;

FIG. 4 is a rear perspective view of the SPS having been converted into the spill plate as a liquid impervious volume-increasing device for the hopper; and FIG. 5 shows the SPS raised from its horizontal positionment as shown in FIGS. 1–3 as demonstrating the flexibility of operation of the SPS as forming a storage lip below the hopper port entrance FIG. 1 shows a rear perspective view of the container attachment of a waste disposal truck. Such container attachment possesses hopper 3 having rigid lip 2 welded or permanently affixed to the lower edge of said hopper in order to form a liquid impervious seal between the walls of the lip and the rear vertical face of the container. Besides increasing the usable volume of the hopper, lip 2 performs further functions hereinafter described. Hydraulic cylinders 5 are vertically mounted on each side of the hopper. The cylinder pistons are each connected to a common stabilizing bar 4 which is further attached to the spill plate step (SPS). The SPS is substantially rectangularly shaped having its major axis parallel to the proximate edge of the container. By actuating hyraulic pistons 5, the common stabilizing bar 4 and attached SPS 1 can be caused to move vertically along slotted transport rails 18. The spill plate step is kept in a horizontal position by means of chain members 6 attached to stabilizing bar 4. FIG. 2 shows hinges 15 attaching SPS 1 to stabilizing bar 4 in more detail. FIG. 2 further shows that the SPS has been raised vertically from the position shown in FIG. 1 to that closer to the hopper mouth.

FIG. 3 shows the SPS raised to a maximum position above ground level so that cylinders 5 are completely closed causing the SPS to transgress through transport rails 18.

A comparison of FIGS. 3 and 4 graphically shows conversion of the SPS from a hydraulic lift device to a spill plate for greatly increasing the volume of the container attachment. Upon reaching a maximum vertical height as shown in FIG. 3, the SPS can be either pushed by hand, or by employing optional hydraulic devices (not shown) lifting the SPS into the configuration depicted in FIG. 4. In such a configuration, the SPS 1 contacts triangular sections 7 (FIG. 2) and lower lip 2 forming a continuous hopper lip extension. When storing within the hopper waste having a significant liquid content, it is many times advantageous to form a liquid impervious seal between lower lip 2, triangular pieces 7 and SPS 1. This can be done by finely machining the contacting surface of these elements or, as shown in FIG. 4, by the use of a rubber seal 11 which has been permanently attached to stabilizing bar 4 in order to form a continuous hopper lip between lower lip 2 and SPS 1.

The "up" position as shown in FIGS. 4 and 5 is obtained by simply lifting the rear edge of the SPS toward the hopper area. The SPS is fastened in this position by engaging two L-shaped locking pins 12, which are mounted on the SPS, into hole recepticles 30 (FIG. 2) located in each of the two container attachment hinged outriggers 9. The hinged outriggers are commonly part of the stabilizing bar 4 and therefore can be maneuvered in a vertical plane by riding in the slotted transport rails mounted adjacent to and inside of each cylinder. Each outrigger can be locked into position by bridging the hinge 17 with an L-shaped pin 33 perpendicular to the axis of the hinge. This hinge is of sufficient length to contact the metal sides on each hinge ensuring stable positioning of the outrigger. When the locking pins are retracted, the outriggers can be folded back on their hinges approximately 150° to again be locked into this unused position with the same locking pins (compare FIGS. 2 and 3). The outriggers have been designed to accept the tubular steel bar connectors affixed to metal refuse containers. These connectors are used as pivotal guides when lifting and dumping the containrs. Vertical slots 20 have been cut into the outriggers to allow a container while being dumped, to drop suddenly to the bottom of the slot. This feature causes a shock to the container while being dumped, to drop suddenly to the bottom of the slot. This feature causes a shock to the container which tends to loosen the contained refuse for easy dumping. When dumping a container, the outriggers are positioned to the height of the tubular bar connector on the container by actuating pistons 5. A roof mounted winch 8 (FIG. 1) is connected to the appropriate tie points on the container. The SPS is raised in conjunction with the winch takeup to is highest point of travel by retracting the cylinder pistons. Thus, the metal container can be pivoted within slots 20 in outrigger 9 to be dumped within hopper 3.

The SPS can be converted from a lip as shown in FIG. 4 to an hydraulic step by disengaging the L-shaped locking pins 12 from the hinged outriggers 9 and holes 30. The step is maintained in a horizontal position by connecting restraining chain or cable 6 as shown, to the outermost corners of the SPS.

As shown in FIG. 5, the SPS can be lifted into its spill-plate configuration at any point. The SPS need not be lifted to the lower edge of the hopper but the hydraulic cylinders 5 can be stopped at any point and the SPS raised. Such flexibility allows for storage of containers or other paraphernalia within the SPS or the SPS can be placed in an "up" position for added maneuverability of the container vehicle.

In order to add structural rigidity to the overall structure and thus increase the stability of the SPS, stabilizing bar 4 can be produced with lower sections 13 (FIG. 5) which contact the rearmost face of the container body 14. Thus, as vertical pressure is placed upon the SPS, lower sections 13 press against face 14 and aid in rigidifying the SPS. An extension can be placed upon face 14 to stabilize the SPS throughout its length of travel.

The present invention can be attached as a modification to any container truck as a means of providing easier access to the hopper opening and in order to provide a lift for operating personnel in the raising of heavy objects. The present invention is particularly advantageous with container-hopper configurations which are of relatively great height above ground level. When the hopper opening is high in order to increase the container volume, operating personnel find it extremely difficult to raise heavy objects into the hopper opening. For example, a container truck such as employed by Orbital Collection Systems of Rockville, Md. and known in the trade as the ORBIE vehicle incorporates an extremely high container opening; in fact, such an opening is so high that operating personnel find loading such vehicle without the present invention to be extremely difficult if not impossible. Therefore, the present invention not only raises operating personnel and their accompanying disposal loads to a convenient height with respect to the hopper opening, but further converts by engagement between the spill plate step, lower hopper lip and triangular sections into an expanded hopper lip which even further increases the volumetric capacity of the container. As a further use, heavy objects such as electrical appliances can be placed upon the SPS, raised to the desired level, and by lifting the forward edge of the SPS, can be dumped into the container hopper with virtually no vertical lifting by operating personnel.

It will be understood that various changes and modifications will be made in the above described structure which provide the characteristics of this invention without departing from the spirit thereof.

What is claimed is:

1. A combination lift and spill plate for use in combination with a container vehicle further including a hatch within a wall of said container vehicle, said hatch further having a lip permanently attached to its lower most edge, comprising:

A. vertical transport means attached to the body of said container vehicle on either side of said hatch;

B. a stabilizing member means operably engaged to be vertically moved by said vehicle transport means, said stabilizing member means further including substantially vertical outrigger members extending rearwardly and proximate said vertical transports;

C. a substantially rectangular spill plate having an innermost edge substantially parallel to said container vehicle wall and further being hingedly attached proximate said innermost edge to said stabilizing member, D. restraining means operable to selectively restrain said spill plate in a substantially horizontal position and securing means for selectively securing said spill plate in contact with said outriggers when said spill plate is pivoted upwardly, E. wherein said spill plate is configured for a first sealing engagement with said stabilizing member means when pivoted into said contact therewith, and said innermost spill plate edge is further configured for a second sealing engagement with said hatch lip when said stabilizing member means is vertically raised proximate said hatch.

2. The combination lift and spill plate of claim 1 wherein said vertical transport means further comprises a piston and cylinders positioned vertically on each side of said hatch.

3. The combination lift and spill plate of claim 1 wherein said sealing engagement is liquid impervious.

4. The combination lift and spill plate of claim 3 wherein said second sealing engagement is accomplished by means of a rubber seal permanently attached to the innermost edge of said spill plate step.

5. The combination lift and spill plate of claim 1 wherein said container vehicle further comprises a winch for engagement with trash receptacles for emptying the contents of said receptacles into said container vehicles.

6. The combination lift and spill plate of claim 5 wherein said outriggers are hingedly attached to said stabilizing member wherein said outriggers further contain slots operable for engagement with said trash receptacles.

7. The combination lift and spill plate of claim 1 wherein said stabilizing member means further comprises triangular shaped members which engage both said spill plate for said first sealing engagement and said hatch lip for said second sealing engagement.

8. The combination lift and spill plate of claim 1 wherein said means for securing said spill plate to said outriggers comprises L-shaped pins connected to said spill plate and adapted for engagement with an orifice within each outrigger.

9. The combinaion lift and spill plate of claim 1 wherein at the position of engagement between said lip, stabilizing member and spill plate step, an extended lip is formed transgressing from said hatch which increases the volume of said container wherein:

i. the outermost edge of said spill plate defines the outermost edge of said extended lip;

ii. the innermost edge of said spill plate step is in sealing contact with said hatch lip; and iii. said stabilizing member means is in further sealing contact with said lip.

* * * * *